(12) United States Patent
Ishii et al.

(10) Patent No.: US 7,825,646 B2
(45) Date of Patent: Nov. 2, 2010

(54) STEP-UP CONVERTER

(75) Inventors: Takuya Ishii, Osaka (JP); Mikio Motomori, Osaka (JP); Junichi Morita, Osaka (JP); Takashi Ryu, Kyoyo (JP); Masaaki Koto, Osaka (JP); Makoto Ishimaru, Osaka (JP); Kazuhito Kimura, Kyoyo (JP); Satoshi Wada, Osaka (JP)

(73) Assignee: Panasonic Corporation, Osaka (JP)

( * ) Notice: Subject to any disclaimer, the term of this patent is extended or adjusted under 35 U.S.C. 154(b) by 425 days.

(21) Appl. No.: 11/905,399

(22) Filed: Sep. 28, 2007

(65) Prior Publication Data

US 2008/0211475 A1 Sep. 4, 2008

(30) Foreign Application Priority Data

Sep. 29, 2006 (JP) ............................. 2006-267191

(51) Int. Cl.
*G05F 1/40* (2006.01)
(52) U.S. Cl. ....................................... 323/285; 323/222
(58) Field of Classification Search ................. 323/222, 323/282, 284, 285, 286, 290, 351
See application file for complete search history.

(56) References Cited

U.S. PATENT DOCUMENTS

| | | | | |
|---|---|---|---|---|
| 5,612,610 A * | 3/1997 | Borghi et al. | ............... | 323/222 |
| 6,600,670 B2 * | 7/2003 | Morita et al. | ............... | 323/222 |
| 7,088,081 B2 * | 8/2006 | Takahashi et al. | ........... | 323/222 |
| 7,141,940 B2 * | 11/2006 | Ortiz | .......................... | 323/282 |
| 2004/0070378 A1 * | 4/2004 | Baldwin et al. | ............. | 323/282 |
| 2005/0218877 A1 | 10/2005 | Oswald et al. | | |
| 2008/0079409 A1 * | 4/2008 | Motomori et al. | ........... | 323/282 |

FOREIGN PATENT DOCUMENTS

JP 2000-134923 5/2000

* cited by examiner

*Primary Examiner*—Jessica Han
(74) *Attorney, Agent, or Firm*—McDermott Will & Emery LLP

(57) ABSTRACT

The present invention provides a current-mode control step-up converter capable of reducing the minimum duty ratio to a sufficiently small value and facilitating the setting of the maximum duty ratio. The step-up converter comprises a current detector 9 for generating a current detection signal Vc corresponding to the current of a rectifier 4; an error amplifier 8 for generating an error signal Ve corresponding to an output DC voltage Vo; and a control circuit 10 for turning ON/OFF the main switch 3 on the basis of the current detection signal Vc and the error signal Ve. The control circuit 10 comprises a comparator 11 and a timer circuit 12. With this configuration, the ON time of the main switch 3 is set at a predetermined value, and the valley value of an inductor current changing in a triangular waveform is controlled. Hence, the OFF time of the main switch is adjusted to stabilize the output. Since the ON time of the main switch 3 can be set as desired, the minimum duty ratio can be reduced to zero or a sufficiently small value.

15 Claims, 10 Drawing Sheets

STEP-UP CONVERTER

BACKGROUND OF THE INVENTION

The present invention relates to a current-mode control step-up converter.

Electronic apparatuses, such as portable apparatuses, use a battery as a power supply. The voltage of this battery is stepped up to a desired voltage using a step-up converter and is used as a power supply voltage for various electronic circuits. The step-up converter is a switching DC-DC converter comprising an inductor, a main switch and a rectifier. The current-mode control system being excellent in stability is known as a control system for the converter. FIG. 10 is a circuit diagram showing the current-mode control step-up converter disclosed in FIG. 4 of Japanese Patent Application Laid-open No. 2000-134923.

The conventional step-up converter shown in FIG. 10 comprises an input DC power supply 201 for supplying an input DC voltage Vi; an inductor 202 and a main switch 203 connected in series with each other and further connected in parallel with the input DC power supply 201; a diode 214 serving as a rectifier and connected between the connection point of the main switch 203 and the inductor 202 and the output of the step-up converter; an output capacitor 205 for supplying an output DC voltage Vo to a load 206; a reference voltage supply 207 for outputting a reference voltage Vr; an error amplifier 218, to which the output DC voltage Vo and the reference voltage Vr are input, for outputting an error signal Ve; a current detector 219 for detecting the current of the inductor 202 and outputting a current detection signal Vc; and a drive circuit 210, to which the error signal Ve and the current detection signal Vc are input, for turning ON/OFF the main switch 203.

With the configuration described above, the drive circuit 210 ON/OFF controls the main switch 203 so that the current detection signal Vc follows the error signal Ve. Hence, the current of the inductor 202 is adjusted so that the output DC voltage Vo becomes equal to the reference voltage Vr. Since the inductor equivalently serves as a current supply in the current-mode control system for not only a step-up converter but also other apparatuses, the influence of the LC resonance between the inductor and the output capacitor to the control operation can be suppressed. Therefore, the current-mode control system makes it possible to attain a DC-DC converter being excellent in control stability and response.

Japanese Patent Application Laid-open No. 2000-134923, featuring a current detector and its insertion position, discloses not only the step-up converter shown in FIG. 10 and serving as a current-mode control step-up converter but also a step-up converter in which a current detector is inserted on the output side of an inductor and a step-up converter in which a current detector is inserted in series with a main switch.

The conventional current-mode control step-up converter detects the current of the inductor or the main switch, and controls its peak value, thereby stabilizing the output. Hence, the main switch must be turned ON, and current is required to flow therethrough. Hence, there exists a minimum ON time (minimum duty ratio). The duty ratio is the ratio of the ON time in one switching cycle. During the ordinary operation, as the duty ratio is larger, the output DC voltage Vo is higher. In other words, as the duty ratio is larger, the step-up ratio (Vo/Vi) of the step-up converter is larger. Conversely, as the duty ratio is smaller, the step-up ratio is smaller and approaches one. The existence of the minimum duty ratio in the step-up converter causes a problem of impairing the stability of the output when the input and output voltages are close to each other.

In addition, since the ON state of the main switch tends to be maintained until the detected current reaches its target value, the duty ratio falls into one if no limitation is set. In the circuit configuration of the step-up converter, it is obvious that no power can be output via the rectifier when the duty ratio is one. Furthermore, the step-up ratio has an upper limit owing to the influence of resistance components including the resistances of the main switch and other components during conduction and wiring resistances, and it is necessary to set the maximum duty ratio so that the step-up ratio does not reach this upper limit.

SUMMARY OF THE INVENTION

Accordingly, an object of the present invention is to provide a current-mode control step-up converter capable of reducing the minimum duty ratio to zero or a sufficiently small value and facilitating the setting of the maximum duty ratio.

For the purpose of attaining the above-mentioned object, a step-up converter according to the present invention, having an inductor and a main switch connected in series, a rectifier for rectifying the voltage across the two terminals of the main switch and a smoothing section for smoothing the rectified voltage, for stepping up an input DC voltage input to the inductor by the ON/OFF operation of the main switch and outputting an output DC voltage from the smoothing section, comprises:

a current detector for generating a current detection signal corresponding to the current of the rectifier; an error amplifier for generating an error signal corresponding to the output DC voltage; and a control circuit for turning ON/OFF the main switch on the basis of the current detection signal and the error signal. With this configuration, since the valley value of the inductor current changing in a triangular waveform is controlled, the OFF time of the main switch is adjusted to stabilize the output.

The control circuit may be configured such that a predetermined ON time is set and the main switch is turned ON only during the predetermined ON time, and such that the main switch is turned OFF until the level of the current detection signal reaches the level of the error signal. With this configuration, the ON time of the main switch can be set as desired, and the minimum duty ratio can be reduced to zero or a sufficiently small value.

In addition, the control circuit may be configured such that a predetermined ON time and a predetermined OFF time are set and the main switch is turned ON only during the predetermined ON time, and such that the main switch is turned OFF during the predetermined OFF time or until the level of the current detection signal reaches the level of the error signal. With this configuration, the minimum duty ratio can be reduced to zero or a sufficiently small value, and the maximum duty ratio can also be set easily.

Furthermore, the control circuit may be configured such that as the input DC voltage is higher, the predetermined ON time is set shorter. With this configuration, fluctuations in the switching frequency and output ripples depending on the input DC voltage can be corrected.

Moreover, the control circuit may be configured such that as the target value of the output DC voltage is higher, the predetermined ON time is set longer. With this configuration, fluctuations in the switching frequency and output ripples depending on the target value of the output DC voltage can be corrected.

Besides, the control circuit may be configured such that the predetermined ON time and a predetermined period including the predetermined ON time are set, and such that the predetermined OFF time is set on the basis of the time difference between the predetermined period and the predetermined ON time. With this configuration, the minimum duty ratio can be reduced to zero or a sufficiently small value, and the maximum duty ratio can also be set easily.

Additionally, the error amplifier may be configured to generate an error signal obtained by amplifying the difference between the output DC voltage and the target value thereof, and the control circuit may be configured such that the main switch is turned OFF when the output DC voltage exceeds a predetermined value higher than the target value and until the output DC voltage becomes lower than the predetermined value. Furthermore, the control circuit may be configured such that the main switch is turned OFF when the level of the error signal is a predetermined level or less, when the output DC voltage exceeds the predetermined value higher than the target value and until the output DC voltage becomes lower than the predetermined value. Moreover, the control circuit may be configured such that the predetermined ON time is made longer when the level of the error signal is a predetermined level or less. With the configuration described above, even in the discontinuous mode at light load in which a problem occurs in the control of the valley value of the inductor current, the output can be stabilized properly.

In addition, the rectifier may be configured using a rectifying transistor for alternately turning ON/OFF the main switch, and the current detector may be configured so as to be equipped with a detection transistor so that the detection transistor and the rectifying transistor form a current mirror circuit at least when turned ON to generate the current detection signal on the basis of the current of the detection transistor. Furthermore, the current detector may be configured so as to be equipped with a differential amplifier to which the voltages at the current output terminals of the rectifying transistor and the detection transistor are input and an adjustment transistor, the conduction resistance of which is adjusted using the output of the differential amplifier, and also configured such that the adjustment transistor is connected to the current output terminal of the detection transistor to generate the current detection signal on the basis of the current of the detection transistor flowing via the adjustment transistor. Moreover, the differential amplifier of the current detector may be configured such that a predetermined offset voltage is set across the two input terminals thereof. With the configuration described above, the currents of the rectifier flowing in opposite directions can be detected accurately at low loss.

The present invention can provide a current-mode control step-up converter capable of reducing the minimum duty ratio to zero or a sufficiently small value and facilitating the setting of the maximum duty ratio.

With the step-up converter according to the present invention, the ON time of the main switch can be set or adjusted as desired, and the valley value of the inductor current changing in a triangular waveform is controlled. Hence, the OFF time of the main switch is adjusted to stabilize the output. Hence, the minimum duty ratio can be reduced to zero or a sufficiently small value, and the maximum duty ratio can also be set easily. Furthermore, fluctuations in the switching frequency and output ripples can be corrected.

While the novel features of the invention are set forth particularly in the appended claims, the invention, both as to organization and content, will be better understood and appreciated, along with other objects and features thereof, from the following detailed description taken in conjunction with the drawings.

It will be recognized that some or all of the Figures are schematic representations for purposes of illustration and do not necessarily depict the actual relative sizes or locations of the elements shown.

DETAILED DESCRIPTION OF THE PREFERRED EMBODIMENTS

First Embodiment

Figure 1A:
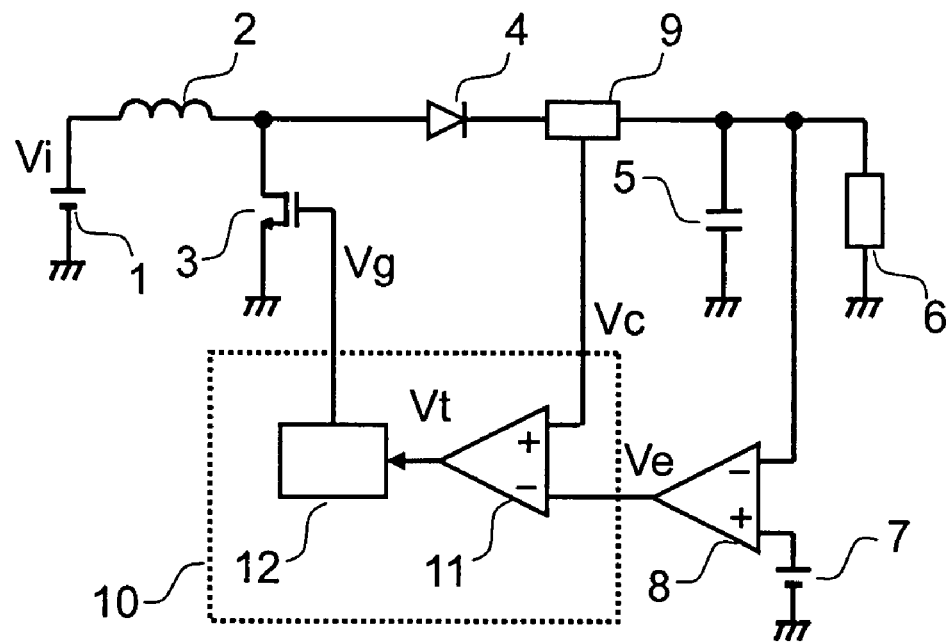
FIG. 1A is a circuit diagram showing a step-up converter according to a first embodiment of the present invention.

The step-up converter according to a first embodiment of the present invention will be described below referring to the drawings. FIG. 1A is a circuit diagram showing the step-up converter according to the first embodiment of the present invention, and FIG. 1B is a graph showing the waveforms of the operation thereof.

Referring to FIG. 1A, numeral 1 designates an input DC power supply, such as a battery, for supplying an input DC voltage Vi. Numeral 2 designates an inductor, one terminal of which is connected to the input DC power supply 1. It is assumed that the inductance of the inductor 2 is L. Numeral 3 designates a main switch that is connected to the other terminal of the inductor 2 and is turned ON/OFF using a drive signal Vg. Numeral 4 designates a rectifier, one terminal of which is connected to the connection point of the inductor 2 and the main switch 3. Numeral 5 designates an output capacitor serving as a smoothing means that is connected to the other terminal of the rectifier 4 to supply an output DC voltage Vo to a load 6. Numeral 7 designates a reference voltage supply, numeral 8 designates an error amplifier that compares the output DC voltage Vo with the voltage of the reference voltage supply 7, amplifies the difference therebetween and generates an error signal Ve. The error signal Ve lowers when the output DC voltage Vo becomes higher than the reference voltage Vr and rises when the output DC voltage Vo becomes lower than the reference voltage Vr. Numeral 9 designates a current detector that detects the current flowing in the rectifier 4 and generates a current detection signal Vc. Numeral 10 designates a control circuit comprising a comparator 11 and a timer circuit 12. The comparator 11 compares the error signal Ve with the current detection signal Vc and outputs a comparison signal Vt. The comparison signal Vt become H level when the error signal Ve is smaller than the current detection signal Vc. The timer circuit 12 sets a predetermined ON time Ton, and outputs the drive signal Vg to turn ON the main switch 3 on the basis of the comparison signal Vt and to turn off the main switch 3 after the ON time. More specifically, upon detection of the lowering of the comparison signal Vt, the timer circuit 12 sets the drive signal Vg at H level. After the predetermined ON time Ton, the timer circuit 12 sets the drive signal Vg at L level.

Figure 1B:
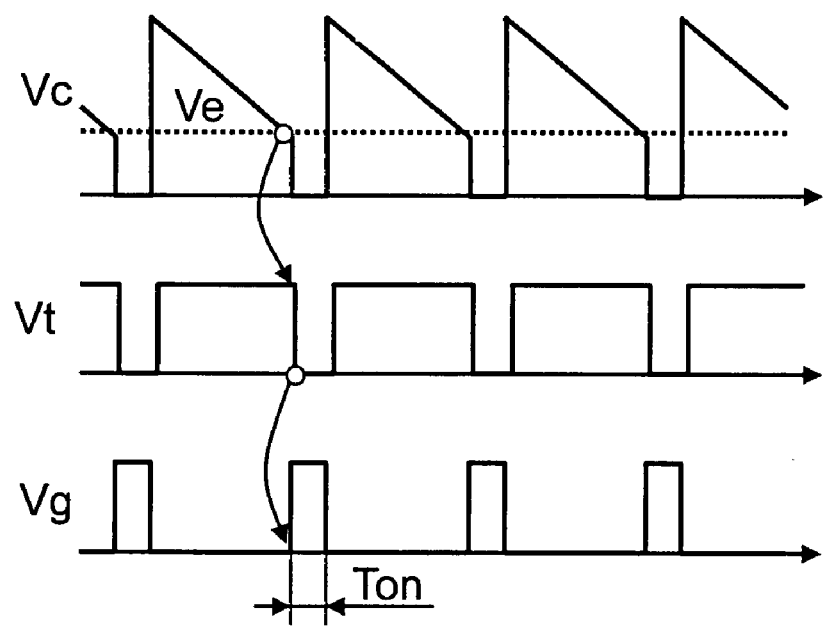
FIG. 1B is a graph showing the waveforms of the operation of the step-up converter according to the first embodiment.

FIG. 1B shows the error signal Ve indicated by a broken line, the current detection signal Vc, the comparison signal Vt and the drive signal Vg.

Figure 2:
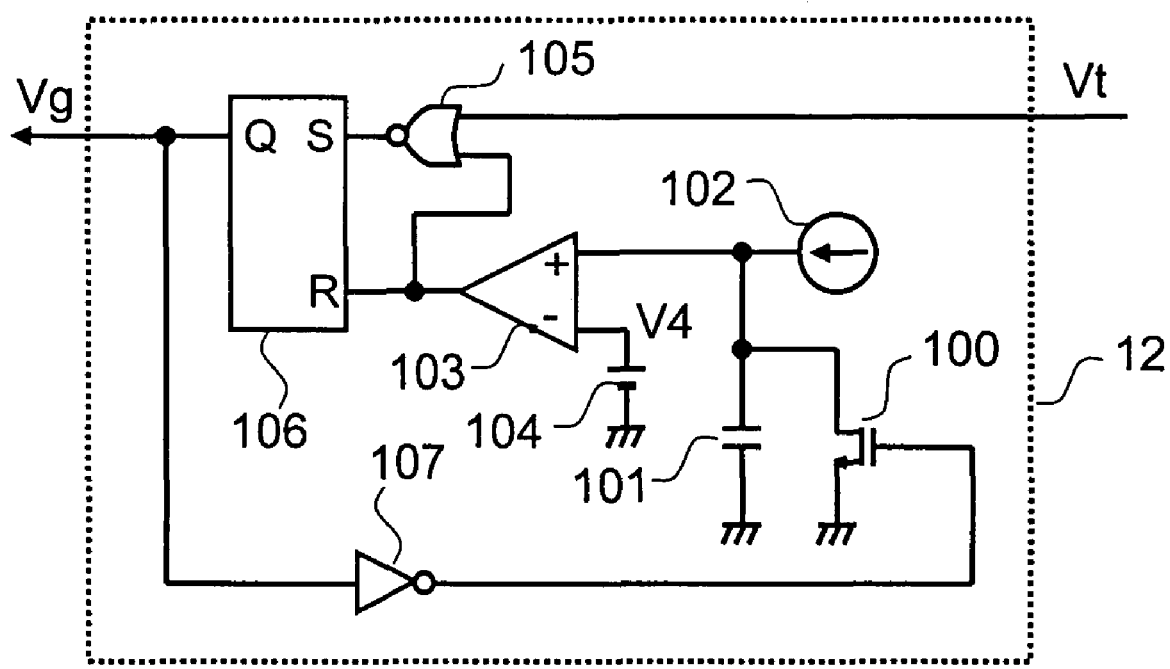
FIG. 2 is a circuit diagram showing the timer circuit 12 of the step-up converter according to the first embodiment.

FIG. 2 is a circuit diagram showing the timer circuit 12. Referring to FIG. 2, numeral 100 designates an NMOS transistor, and numeral 101 designates a capacitor that is short-circuited and discharged when the NMOS transistor 100 turns ON. Numeral 102 designates a current supply circuit that charges the capacitor 101 using a constant current. Numeral 103 designates a comparator, to the non-inverting input terminal of which the potential of the capacitor 101 is input. Numeral 104 designates a reference voltage supply that applies a reference voltage V4 to the inverting input terminal of the comparator 103. Numeral 105 designates a NOR circuit that generates the NOR signal of the comparison signal Vt and the output of the comparator 103. Numeral 106 designates an RS latch that is set using the output of the NOR circuit 105 and reset using the output of the comparator 103, and outputs the drive signal Vg. Numeral 107 designates an inverter that inverts the drive signal Vg and applies the inverted signal to the gate of the NMOS transistor 100.

The operation of the step-up converter according to the first embodiment of the present invention will be described below referring to FIGS. 1A, 1B and 2.

First, referring to FIG. 1A, when the main switch 3 is ON, the input DC voltage Vi is input to the inductor 2, an increasing current flows in the inductor 2, and energy is stored therein. When the predetermined ON time is reached by the timer circuit 12 described later, the drive signal Vg becomes L level, and the main switch 3 turns OFF.

When the main switch 3 becomes OFF in FIG. 1A, a decreasing current flows from the input DC power supply 1 to the output capacitor 5 via the rectifier 4 while charging the output capacitor 5, whereby the energy stored in the inductor 2 is discharged. The current flowing in the rectifier 4 is DC-smoothed using the output capacitor 5 and supplied to the load 6. In addition, the current flowing in the rectifier 4 is detected using the current detector 9, and the current detection signal Vc corresponding to the current is generated as shown in FIG. 1B.

On the other hand, the voltage of the output capacitor 5, that is, the output DC voltage Vo, is supplied to the error amplifier 8. The voltage difference between the output DC voltage Vo and the reference voltage Vr of the reference voltage supply 7 is amplified using the error amplifier 8 and output as the error signal Ve. In the control circuit 10, the current detection signal Vc is compared with the error signal Ve using the comparator 11. Although the inductor current flowing in the rectifier 4 decreases when the main switch 3 is OFF, the current detection signal Vc is higher than the error signal Ve, and the comparison signal Vt output from the comparator 11 is H level.

Referring to FIG. 2, when the drive signal Vg is L level and the comparison signal Vt is H level, the NMOS transistor 100 is ON, the NOR circuit 105 outputs an L-level signal, and the capacitor 101 is short-circuited and discharged. Hence, the potential of the capacitor 101 is lower than the voltage V4 of the reference voltage supply 104, and the comparator 103 outputs an L-level signal. As a result, the drive signal Vg of the RS latch 106 remains L level.

As the inductor current flowing into the rectifier 4 decreases, the current detection signal Vc also lowers. When the current detection signal Vc becomes lower than the error signal Ve as shown in FIG. 1B, the comparison signal Vt output from the comparator 11 changes from H level to L level. When the comparison signal Vt becomes L level, the output of the NOR circuit 105 shown in FIG. 2 becomes H level, the RS latch 106 is set, and the drive signal Vg becomes H level. When the drive signal Vg becomes H level, the main switch 3 turns ON. At the same time, the NMOS transistor 100 shown in FIG. 2 turns OFF, the capacitor 101 is charged by the current of the current supply circuit 102, and its potential rises gradually.

While the main switch 3 is ON and when the potential of the capacitor 101 becomes higher than the voltage V4, the output of the comparator 103 becomes H level, the RS latch 106 is reset, and the drive signal Vg becomes L level. When the drive signal Vg becomes L level, the main switch 3 turns OFF. The ON time Ton of the main switch 3 is nearly equal to the charging time from the release of the short-circuited state of the capacitor 101 to the arrival to the voltage V4. The ON time is represented as follows using the capacitance C1 of the capacitor 101, the constant current I2 output from the current supply circuit 102 and the voltage V4 of the reference voltage supply 104.

$$Ton = C1 \times V4 / I2 \tag{1}$$

The error signal Ve lowers when the output DC voltage Vo becomes higher than the reference voltage Vr and rises when the output DC voltage Vo becomes lower than the reference voltage Vr. Hence, when the output DC voltage Vo becomes higher than the reference voltage Vr, the error signal Ve lowers, the OFF time of the main switch 3 is extended, the inductor current is reduced, and the output DC voltage Vo lowers. By the above-mentioned operation, the current flowing in the rectifier 4, that is, the valley value of the inductor current, is controlled so that the output DC voltage Vo becomes equal to the reference voltage Vr. As a result, the OFF time is controlled, and the output DC voltage Vo is stabilized.

As described above, with the step-up converter according to the first embodiment, although the ON time of the main switch 3 is fixed to a predetermined value, the OFF time thereof is adjusted. For this reason, if the switching frequency is allowed to change, the duty ratio can change widely, and the restriction on the minimum duty ratio is eliminated substantially. Furthermore, if the ON time of the main switch is fixed to the predetermined value, the amount of the electric charge to be charged into and discharged from the output capacitor 5 during one switching cycle becomes nearly constant, whereby there is an effect of restricting the change in the input condition of the output ripple voltage, AC component, to be superimposed on the output DC voltage Vo.

It would be obvious that the maximum output current can be restricted, for example, by setting an upper limit on the error signal Ve.

Second Embodiment

Figure 3A:
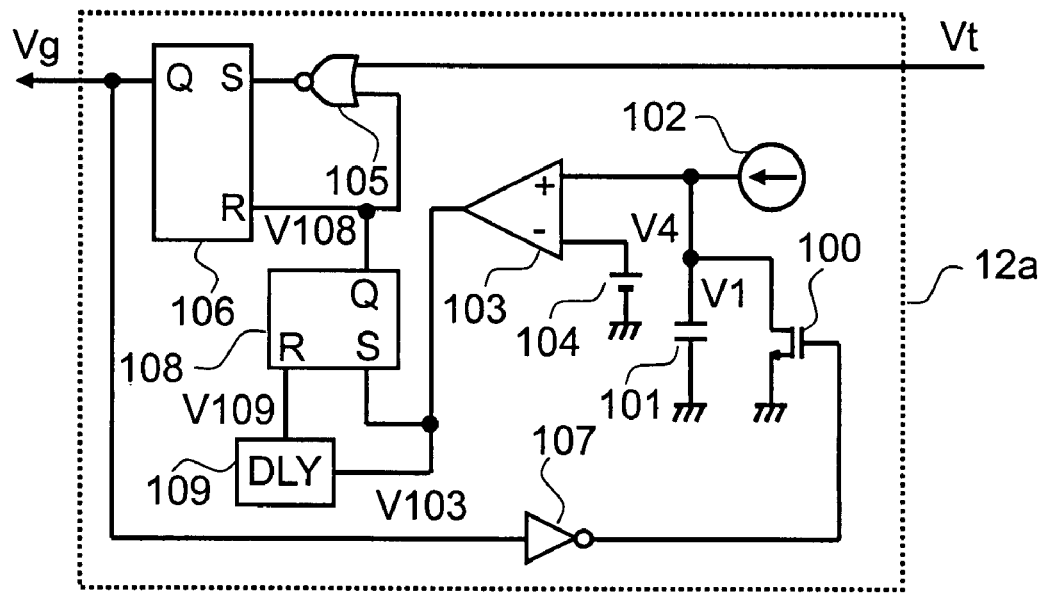
FIG. 3A is a circuit diagram showing the timer circuit 12a of a step-up converter according to a second embodiment.

FIG. 3A is a circuit diagram showing the timer circuit 12a of a step-up converter according to a second embodiment of the present invention. The timer circuit 12a according to the second embodiment can set the minimum OFF time in addition to the ON time setting function of the timer circuit 12 according to the first embodiment described above. Since the configuration of the step-up converter according to the second embodiment is similar to the configuration of the step-up converter according to the first embodiment described above except for the timer circuit 12a, in FIG. 3A, the input DC power supply 1, the inductor 2, the main switch 3, the rectifier 4, the smoothing means 5, the load 6, the reference voltage supply 7, the error amplifier 8 and the current detector 9 shown in FIG. 1A are not shown. In addition, the comparator 11 of the constant current 10 is not shown either since its configuration is similar to that according to the first embodiment. In the timer circuit 12a of the step-up converter according to the second embodiment shown in FIG. 3A, the components having the same configurations as those of the components according to the first embodiment are designated by the same numerals, and their descriptions are omitted. The timer circuit 12a of the step-up converter according to the second embodiment differs from the timer circuit 12 of the step-up converter according to the first embodiment shown in FIG. 2 in that an RS latch 108 that is set using the output of the comparator 103 and a delay circuit 109 for resetting the RS latch 108 while delaying the output of the comparator 103 by the predetermined time, that the output of the RS latch 108 and the comparison signal Vt are input to the NOR circuit 105, and that the output of the RS latch 108 resets the RS latch 106.

Figure 3B:
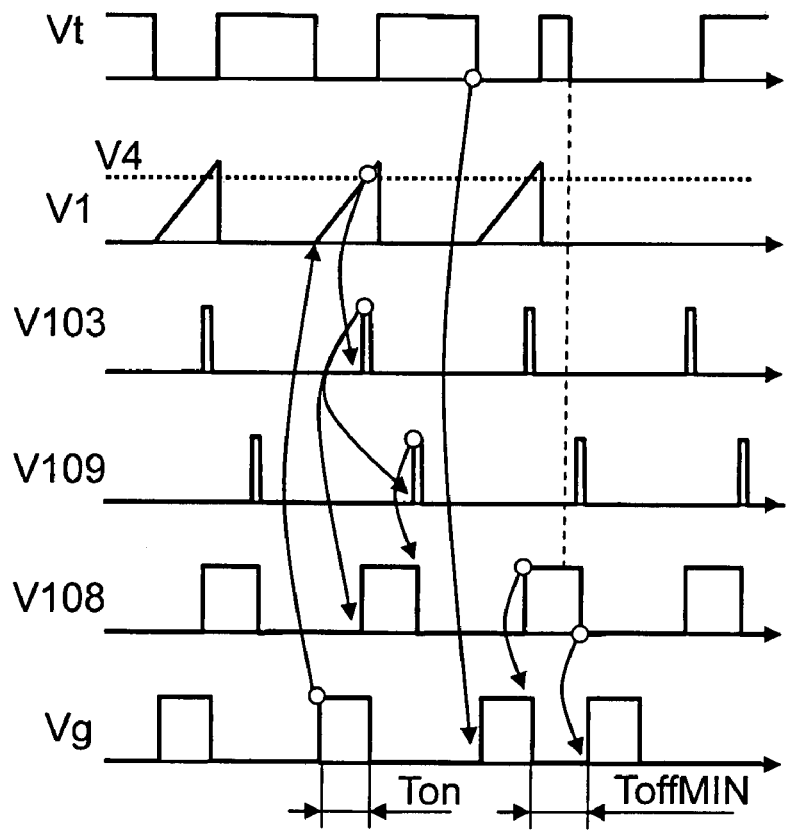
FIG. 3B is a graph showing the waveforms of the operation of the timer circuit 12a of the step-up converter according to the second embodiment.

FIG. 3B is a graph showing the operation waveforms of the comparison signal Vt, the voltage V1 of the capacitor 101, the voltage V4, the voltage V103 of the comparator 103, the output V109 of the delay circuit 109, the output V108 of the RS latch 108, and the drive signal Vg shown in FIG. 3A.

The operation of the timer circuit 12a of the step-up converter according to the second embodiment of the present invention shown in FIG. 3A will be described below referring to FIG. 3B, the graph showing the operation waveforms.

First, referring to FIG. 3A, when the drive signal Vg is L level and the main switch 3 is OFF, as the inductor current flowing in the rectifier 4 decreases, the current detection signal Vc lowers. When the current detection signal Vc becomes lower than the error signal Ve, the comparison signal Vt changes from H level to L level. When the comparison signal Vt becomes L level, the output of the NOR circuit 105 becomes H level, the RS latch 106 is set, and the drive signal Vg becomes H level. When the drive signal Vg becomes H level, the main switch 3 turns ON. At the same time, the NMOS transistor 100 shown in FIG. 3A turns OFF, and the capacitor 101 is charged by the current of the current supply circuit 102.

When the rising voltage V1 of the capacitor 101 exceeds the voltage V4, the output of the comparator 103 becomes H level, the RS latch 108 is set and outputs an H-level signal. Hence, the RS latch 106 is reset, and the drive signal Vg becomes L level. When the drive signal Vg becomes L level, the main switch 3 turns OFF. The ON time Ton of the main switch 3 is nearly equal to the charging time from the release of the short-circuited state of the capacitor 101 to the arrival to the voltage V4. The ON time of the main switch 3 is represented by the above-mentioned expression (1) using the capacitance C1 of the capacitor 101, the constant current I2 output from the current supply circuit 102 and the voltage V4 of the reference voltage supply 104 as in the first embodiment.

When the main switch 3 is OFF, the inductor current flows into the rectifier 4, and the current detection signal Vc is generated, whereby the comparison signal Vt output from the comparator 11 becomes H level. At this time, the NOR circuit outputs an L-level signal, the NMOS transistor 100 turns ON, and the capacitor 101 is short-circuited and discharged. As a result, the voltage V1 of the capacitor 101 becomes lower than the voltage V4 of the reference voltage supply 104, and the output of the comparator 11 becomes L level. Hence, the output V103 of the comparator 103 is a one shot pulse signal that is generated when the main switch 3 turns OFF.

This one shot pulse signal, the output V103 of the comparator 103, resets the RS latch 108 while the resetting is delayed using the delay circuit 109 by the predetermined time. Since the output of the RS latch 108 is H level until it is reset using the delay signal V109, the NOR circuit 105 outputs an L-level signal during this period, regardless of the level of the comparison signal Vt. In other words, in the RS latch 106, a minimum OFF time ToffMIN during which the drive signal Vg is maintained at L level can be set. When the current detection signal Vc become lower than the error signal Ve, the comparison signal Vt becomes L level, and the L level is detected. After this minimum OFF time ToffMIN has passed from the detection, the RS latch 106 sets the drive signal at H level. This action is shown using the waveforms shown on the right side of FIG. 3B.

The current flowing in the rectifier 4, that is, the valley value of the inductor current, is controlled so that the output DC voltage Vo becomes equal to the reference voltage Vr. As a result, the OFF time is controlled, and the output DC voltage Vo is stabilized as in the first embodiment.

As described above, in the step-up converter according to the second embodiment, the minimum OFF time amounting to the delay time set in the delay circuit can be set, and the ON time is set at the predetermined value, whereby the maximum duty ratio can be set easily.

Third Embodiment

Figure 4A:
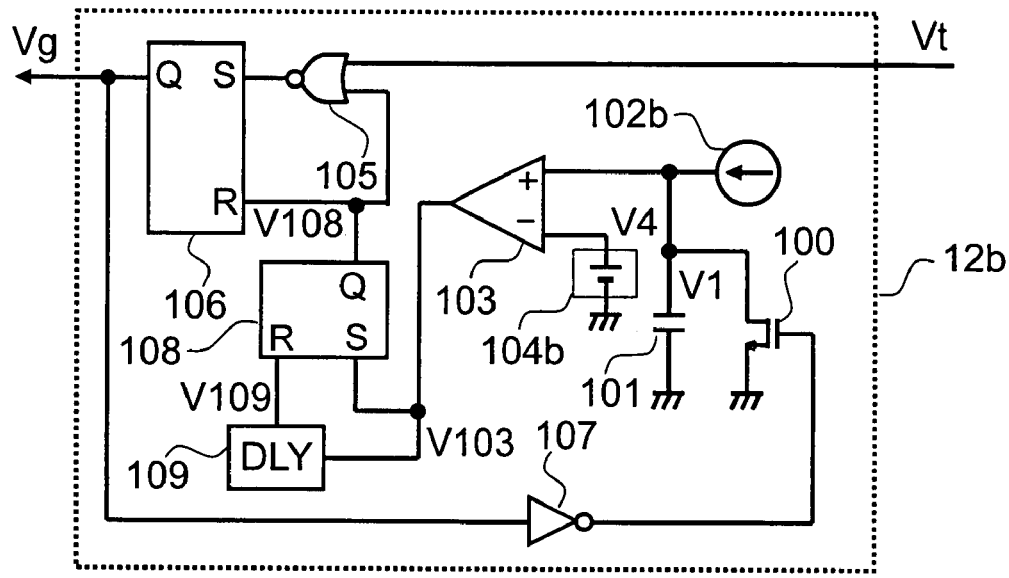
FIG. 4A is a circuit diagram showing the timer circuit 12b of a step-up converter according to a third first embodiment.

FIG. 4A is a circuit diagram showing the timer circuit 12b of a step-up converter according to a third embodiment of the present invention, wherein the ON time can be corrected using input/output DC voltages in addition to the function of the timer circuit 12a according to the second embodiment described above. Referring to FIG. 4A, the same components as those of the timer circuit 12a of the step-up converter according to the second embodiment shown in FIG. 3A are designated by the same numerals, and their descriptions are omitted. The timer circuit 12b of the step-up converter according to the third embodiment differs from the timer circuit 12a shown in FIG. 3A in the configurations of the current supply circuit 102b and the voltage supply circuit 104b thereof. The circuit configuration of the current supply circuit 102b is shown in FIG. 4B, and the circuit configuration of the voltage supply circuit 104b is shown in FIG. 4C.

Figure 4B:
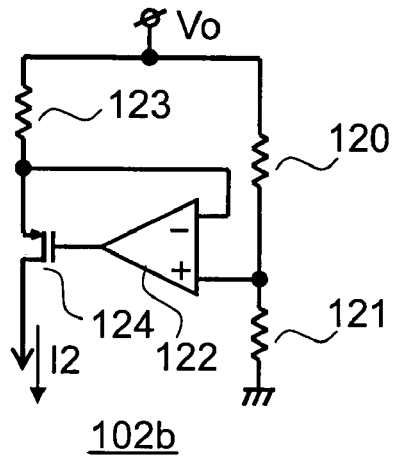
FIG. 4B is a circuit diagram showing the current supply circuit 102b of the timer circuit 12b.

Referring to FIG. 4B, the current supply circuit 102b comprises a resistor 120, a resistor 121, a differential amplifier 122, a resistor 123, and a PMOS transistor 124. The output DC voltage Vo is divided using the resistor 120 and the resistor 121, and the obtained voltage is applied to the non-inverting input terminal of the differential amplifier 122. The resistor 123 is connected between the inverting input terminal of the differential amplifier 122 and the output terminal. The source of the PMOS transistor 124 is connected to the inverting input terminal of the differential amplifier 122, the gate of the PMOS transistor 124 is connected to the output of the differential amplifier 122, and a current I2 is output from the drain of the PMOS transistor 124. When it is assumed that the voltage division ratio of the resistor 120 and the resistor 121 is α, the voltage applied to the non-inverting input terminal of the differential amplifier 122 is represented by α×Vo. Since the differential amplifier 122 operates such that its input terminal voltages become equal, when it is assumed that the resistance value of the resistor 123 is R1, the current I2 output from the drain of the PMOS transistor 124 is proportional to the output DC voltage Vo and represented by the following expression (2).

$$I2=(1-\alpha)\times Vo/R1 \quad (2)$$

Figure 4C:
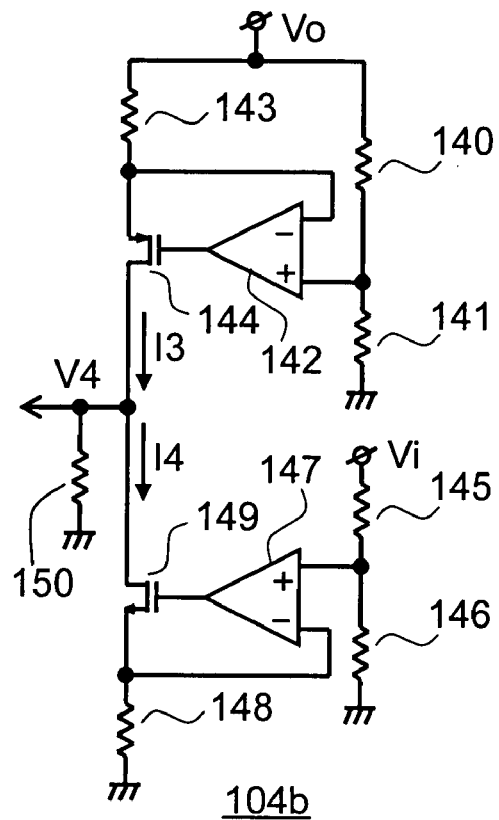
FIG. 4C is a circuit diagram showing the voltage supply circuit 104b of the timer circuit 12b.

Referring to FIG. 4C, the voltage supply circuit 104b comprises a resistor 140, a resistor 141, a differential amplifier 142, a resistor 143, a PMOS transistor 144, a resistor 145, a resistor 146, a differential amplifier 147, a resistor 148, an NMOS transistor 149 and a resistor 150. The configuration comprising the resistor 140, the resistor 141, the differential amplifier 142, the resistor 143 and the PMOS transistor 144 is similar to that of the current supply circuit 102b. Hence, when it is assumed that the voltage division ratio of the resistor 140 and the resistor 141 is β and that the resistance value of the resistor 143 is R2, the current I3 output from the drain of the PMOS transistor 144 is proportional to the output DC voltage Vo and represented by the following expression (3).

$$I3=(1-\beta)\times Vo/R2 \quad (3)$$

On the other hand, the input DC voltage Vi is divided using the resistor 145 and the resistor 146, and the obtained voltage is applied to the non-inverting input terminal of the differential amplifier 147. The resistor 148 is connected between the inverting input terminal of the differential amplifier 147 and the ground terminal. The source of the NMOS transistor 149 is connected to the inverting input terminal of the differential amplifier 147, and the gate of the NMOS transistor 149 is connected to the output of the differential amplifier 147, and a current I4 flows into the drain of the NMOS transistor 49. When it is assumed that the voltage division ratio of the resistor 145 and the resistor 146 is (1−β), the voltage applied to the non-inverting input terminal of the differential amplifier 147 is represented by (1−β)×Vo. Since the differential amplifier 147 operates such that its input terminal voltages become equal, when it is assumed that the resistance value of the resistor 148 is equal to that of the resistor 143, that is, R2, the current I4 flowing into the drain of the NMOS transistor 149 is proportional to the input DC voltage Vi and represented by the following expression (4).

$$I4=(1-\beta)\times Vi/R2 \quad (4)$$

The drain of the PMOS transistor 144 is connected to the drain of the NMOS transistor 149, and the connection point is grounded via the resistor 150. With this configuration, the difference current (I3−I4) between the current I3 output from the drain of the PMOS transistor 143 and the current I4 flowing into the drain of the NMOS transistor 149 flows into the resistor 150. Since the voltage drop across the resistor 150 is output as the voltage V4, when it is assumed that the resistance value of the resistor 150 is equal to that of the resistor 143 and the resistor 148, that is, R2, the voltage V4 is proportional to the input/output voltage difference (Vo−Vi) and represented by the following expression (5).

$$V4=(I3-I4)\times R2=(1-\beta)\times(Vo-Vi) \quad (5)$$

As described above, in the step-up converter according to this embodiment, the capacitor 101 is charged by the current proportional to the output DC voltage Vo, and the charging-end voltage V4 thereof is made proportional to the input/output voltage difference (Vo−Vi), whereby the ON time Ton can be made proportional to the input/output voltage difference (Vo−Vi)/Vo. When the step-up converter operates stably, it is known that the relationship between the input and output voltages can be represented by the following expression (6).

$$Vo/Vi=T/(T-Ton) \quad (6)$$

wherein T is a switching cycle. On the basis of this relationship, the relationship between the switching cycle T and the ON time Ton is represented by the following expression (7).

$$Ton/T=(Vo-Vi)/Vo \quad (7)$$

Hence, the fluctuations in the switching cycle T owing to the changes in the settings or the fluctuations of the input/output voltages, that is, the fluctuations in the switching frequency can be suppressed by making the ON time Ton proportional to the input/output voltage difference (Vo−Vi)/Vo. Since the large fluctuations in the switching frequency widen the frequency band of switching noise, it is a big problem to take measures against the widening of the frequency band of switching noise in the fields of AV apparatuses and communication apparatuses in particular. The effect obtained as in this embodiment by suppressing the fluctuations in the switching frequency is significant.

In consideration that Vo−Vi≈0 V at the operation start time of the step-up converter, the target value of the output DC voltage Vo may be used instead of the output DC voltage Vo that is used as a parameter for setting the charging current and the charging-end voltage V4 of the capacitor 101.

Fourth Embodiment

Figure 5A:
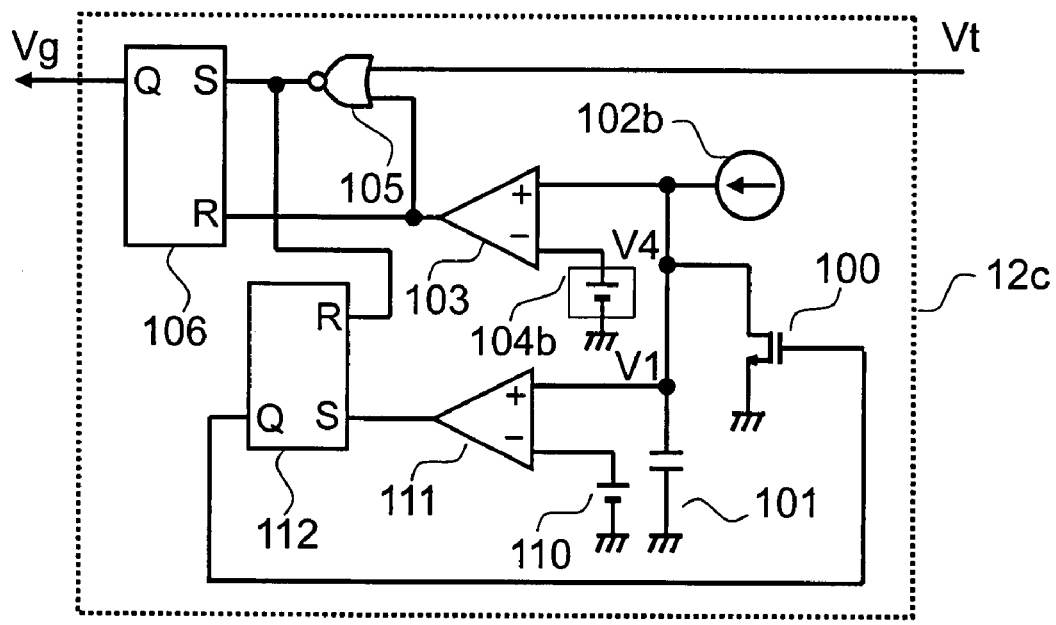
FIG. 5A is a circuit diagram showing the timer circuit 12c of a step-up converter according to a fourth embodiment.

FIG. 5A is a circuit diagram showing the timer circuit 12c of a step-up converter according to a fourth embodiment of the present invention, wherein the limitation of the maximum duty ratio in higher performance by the setting of a minimum cycle instead of the minimum OFF time setting function is attained in addition to the ON time correction function using the input/output DC voltages of the timer circuit 12b according to the third embodiment described above. Referring to FIG. 5A, the same components as those of the timer circuit 12b of the step-up converter according to the third embodiment shown in FIG. 4A are designated by the same numerals, and their descriptions are omitted. The timer circuit 12c of the step-up converter according to the fourth embodiment differs from the timer circuit 12b shown in FIG. 4A in that the inverter 107, the RS latch 108 and the delay circuit 109 are eliminated, that the RS latch 106 is directly reset using the output of the comparator 103 and that a voltage supply circuit 110, a comparator 111 and an RS latch 112 are added.

The comparator 111 compares the voltage of the capacitor 101 with the voltage V10 of the voltage supply circuit 110. If the voltage of the capacitor 101 exceeds the voltage V10, the RS latch 112 is set. The RS latch 112 is reset using the output of the NOR circuit 105, and the output of the RS latch 112 is applied to the gate of the NMOS transistor 100.

Figure 5B:
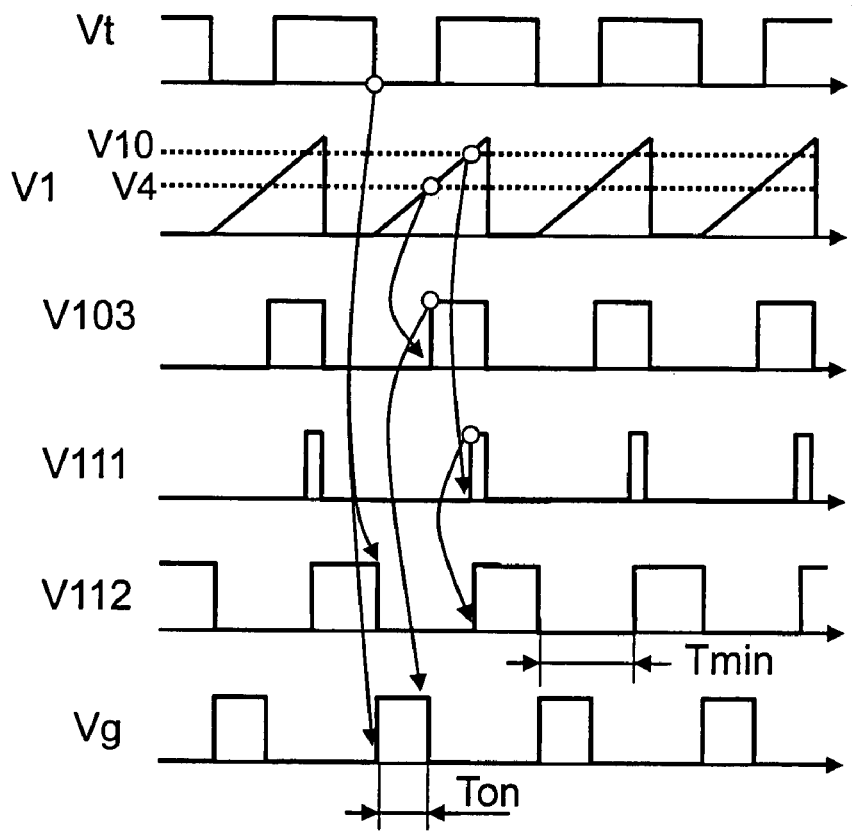
FIG. 5B is a graph showing the waveforms of the operation of the timer circuit 12c of the step-up converter according to the fourth embodiment.

FIG. 5B is a graph showing the operation waveforms of the comparison signal Vt, the voltage V1 of the capacitor 101, the voltage V4, the voltage V10, the voltage V103 of the comparator 103, the output V111 of the comparator 111, the output V112 of the RS latch 112 and the drive signal Vg shown in FIG. 5A. The operation of the timer circuit 12c of the step-up converter according to the fourth embodiment of the present invention shown in FIG. 5A will be described below referring to FIG. 5B, the graph showing the operation waveforms.

First, referring to FIG. 5A, it is assumed that the drive signal Vg is L level, that the comparison signal Vt is H level, that the output V103 of the comparator 103 is L level, that the output of the RS latch 112 is H level, that the NMOS transistor 100 is ON, that the capacitor 101 is short-circuited and discharged, and that the voltage V1 thereof is 0 V. The main switch 3 is OFF. As the inductor current flowing in the rectifier 4 decreases, the current detection signal Vc lowers. When the current detection signal Vc becomes lower than the error signal Ve, the comparison signal Vt changes from H level to L level. When the comparison signal Vt becomes L level, the output of the NOR circuit 105 becomes H level, the RS latch 106 is set, and the drive signal Vg becomes H level. When the drive signal Vg becomes H level, the main switch 3 turns ON. At the same time, the RS latch 112 is reset and outputs an L-level signal, the NMOS transistor 100 turns OFF, and the capacitor 101 is charged by the current of the current supply circuit 102b.

When the rising voltage V1 of the capacitor 101 exceeds the voltage V4, the output of the comparator 103 becomes H level, the RS latch 106 is reset, and the drive signal Vg becomes L level. When the drive signal Vg becomes L level, the main switch 3 turns ON. The ON time Ton of the main switch 3 is nearly equal to the charging time from the release of the short-circuited state of the capacitor 101 to the arrival to the voltage V4. The ON time is represented by the above-mentioned expression (1) using the capacitance C1 of the capacitor 101, the constant current I2 output from the current supply circuit 102b and the voltage V4 of the reference voltage supply 104b as in the first embodiment.

When the main switch 3 is OFF, the inductor current flows in the rectifier 4, and the current detection signal Vc is generated, whereby the comparison signal Vt becomes H level. At this time, the NOR circuit 105 outputs an L-level signal. The voltage V1 of the capacitor 101 exceeds the voltage V4 of the reference voltage supply 104b and continues to rise. When the rising voltage V1 of the capacitor 101 exceeds the voltage V10, the output of the comparator 111 becomes H level, and the RS latch 112 is set and outputs an H-level signal. Hence, the NMOS transistor 100 turns ON, and the capacitor 101 is short-circuited and discharged. Since the voltage V1 of the capacitor 101 becomes lower than the voltage V4, the output V103 of the comparator 103 becomes L level, and the set input of the RS latch 106 is accepted. In the period during which the voltage V1 of the capacitor 101 exceeds the voltage V4 and reaches the voltage V10, the NOR circuit 105 outputs an L-level signal, regardless of the level of the comparison signal Vt. In other words, in the RS latch 106, a minimum OFF time during which the drive signal Vg is maintained at L level is set. When the current detection signal Vc become lower than the error signal Ve, the comparison signal Vt becomes L level, and the L level is detected. After this minimum OFF time has passed from the detection, the RS latch 106 sets the drive signal at H level.

However, the minimum OFF time of the step-up converter according to the fourth embodiment differs depending on the ON time as described above. This is because a minimum cycle Tmin is set in this embodiment. The minimum cycle Tmin is represented by the following expression (8) using the capacitance C1 of the capacitance C1, the current I2 of the current supply circuit 102b and the voltage V10 of the voltage supply circuit 110.

$$Tmin = C1 \times V1/I2 \tag{8}$$

As described above, in the step-up converter according to the fourth embodiment, the minimum cycle can be set, and the ON time is set at the predetermined value, whereby the maximum duty ratio can be set easily. In addition, by the setting of the minimum cycle, when the ON time becomes shorter at the time of high input for example, the minimum OFF time becomes longer. That is to say, as the input is higher, the maximum duty ratio can be set smaller.

Fifth Embodiment

Figure 6:
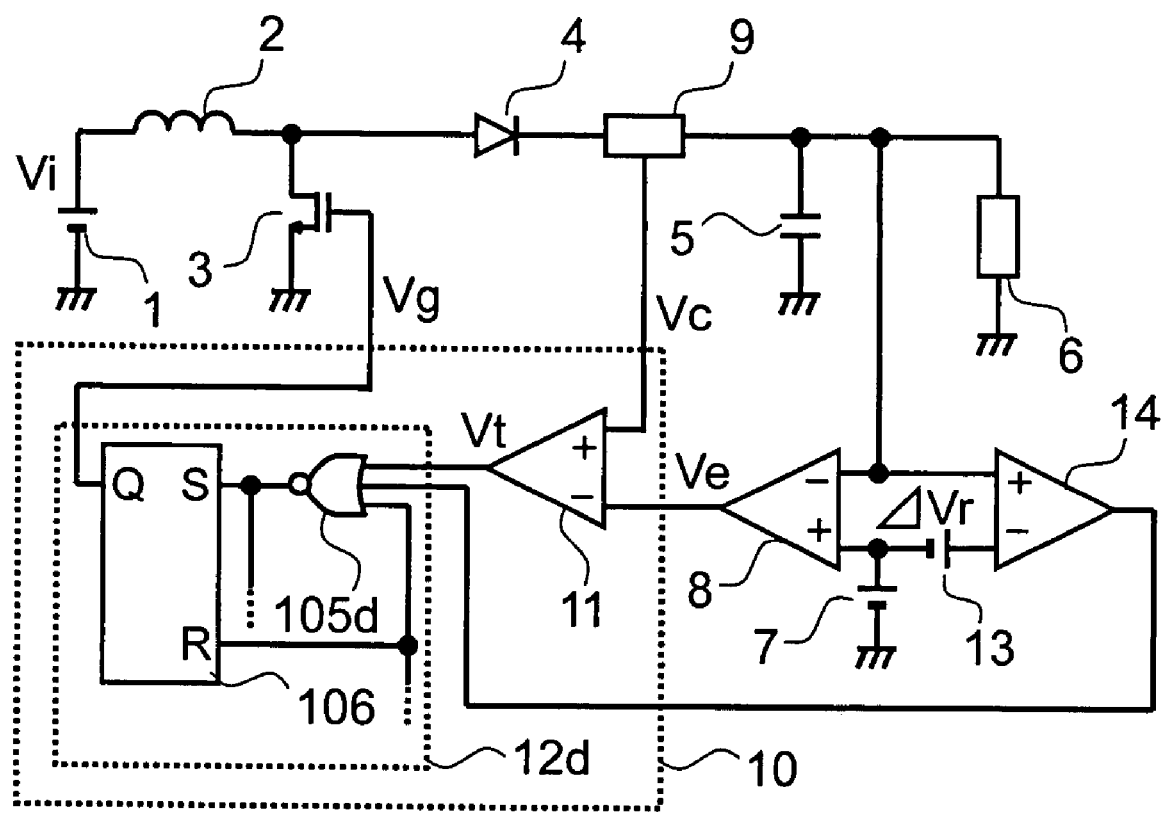
FIG. 6 is a circuit diagram showing a step-up converter according to a fifth embodiment.

The step-up converters according to the respective embodiments described above employ a control method in which the current of the rectifier 4 is detected and the valley value of the inductor current is adjusted. However, under the condition that the load 6 is light and the output current is small, the step-up converter enters a discontinuous mode in which the current of the rectifier 4 becomes zero when the main switch 3 is OFF. In such a case, control cannot be performed. FIG. 6 is a circuit diagram showing a step-up converter according to a fifth embodiment of the present invention configured to cope with the discontinuous mode described above. Referring to FIG. 6, the same components as those of the step-up converter according to the first embodiment shown in FIG. 1A are designated by the same numerals, and their descriptions are omitted. The step-up converter shown in FIG. 6 differs from the step-up converter according to the first embodiment shown in FIG. 1A in that a voltage supply circuit 13 for generating a voltage that is higher than the reference voltage Vr of the reference voltage supply 7 by ΔVr and a comparator 14 for comparing the output DC voltage Vo with (Vr+ΔVr) are added, and that the output of the comparator 14 is input to a timer circuit 12d. Since the configuration of the timer circuit 12d is almost the same as that of the timer circuit 12c according to the fourth embodiment, the description of the most part thereof is omitted, and only the RS latch 106 for outputting the drive signal Vg and a NOR circuit for setting the RS latch 106 are described. The timer circuit 12d differs from the timer circuit 12c according to the fourth embodiment in the NOR circuit for setting the RS latch 106. The NOR circuit is herein referred to as the NOR circuit 105d so as to be distinguished from the NOR circuit 105. The NOR circuit 105d has three input terminals to which, in addition to the comparison signal Vt and the output of the comparator 103, the output of the comparator 14 is input.

The step-up operation of the step-up converter according to the fifth embodiment of the present invention shown in FIG. 6 will be described below.

During the ordinary operation in which the load 6 is heavy to some extent, the output DC voltage Vo is stabilized at the reference voltage Vr, and the comparator 14 outputs an L-level signal. Hence, the output of the NOR circuit 105d is determined by the comparison signal Vt and the output of the comparator 103. As a result, the step-up converter operates in a way similar to that of the step-up converter according to the fourth embodiment described above.

Next, the operation in the discontinuous mode in which the load 6 is light and the current of the rectifier 4 becomes zero when the main switch 3 is OFF will be described below. In this state, the output Ve of the error amplifier 8 is stuck at the lower limit voltage higher than 0 V. Hence, when the current of the rectifier 4 becomes zero, the output of the comparator 11 is inverted, and the comparison signal Vt becomes L level. As a result, the drive signal Vg becomes H level, the main switch 3 turns ON, current flows in the inductor 2, and energy is stored therein. Since the ON time of the main switch 3 is the predetermined value set in the timer circuit 12d, if this ON/OFF operation is repeated, the output DC voltage Vo rises from the reference voltage Vr.

If the output DC voltage Vo exceeds (Vr+ΔVr), the output of the comparator 14 is inverted from L level to H level, and the output of the NOR circuit 105d is fixed at L level. In other words, even if the current of the rectifier 4 becomes zero and the comparison signal Vt becomes L level, the RS latch 106 is not set. Since the drive signal Vg is L level, the main switch 3 remains OFF. When the output DC voltage Vo lowers and becomes lower than (Vr+ΔVr) owing to the discharge by the power supply from the output capacitor 5 to the load 6, the output of the comparator 14 is inverted from H level to L level. In addition, since the comparison signal Vt is L level and the output of the comparator 103 is L level, the NOR circuit 105d outputs an H-level signal, thereby setting the RS latch 106. Hence, the drive signal Vg becomes H level, and the main switch 3 turns ON.

When the main switch 3 turns OFF after it has turned ON for a predetermined ON time, the energy stored in the inductor 2 is released as a current for charging the output capacitor 5 via the rectifier 4. When the output capacitor 5 is charged and the output DC voltage Vo exceeds (Vr+ΔVr) again, the OFF state of the main switch 3 is maintained until the output DC voltage Vo becomes lower than (Vr+ΔVr). By the repetition of the above-mentioned operation, the output DC voltage Vo is stabilized at (Vr+ΔVr).

Although it is desired that ΔVr is made as small as possible, ΔVr must be set so as to be not less than the output ripple voltage generated during the heavy load operation so that the output of the comparator 14 does not becomes H level during the heavy load operation.

Sixth Embodiment

Figure 7:
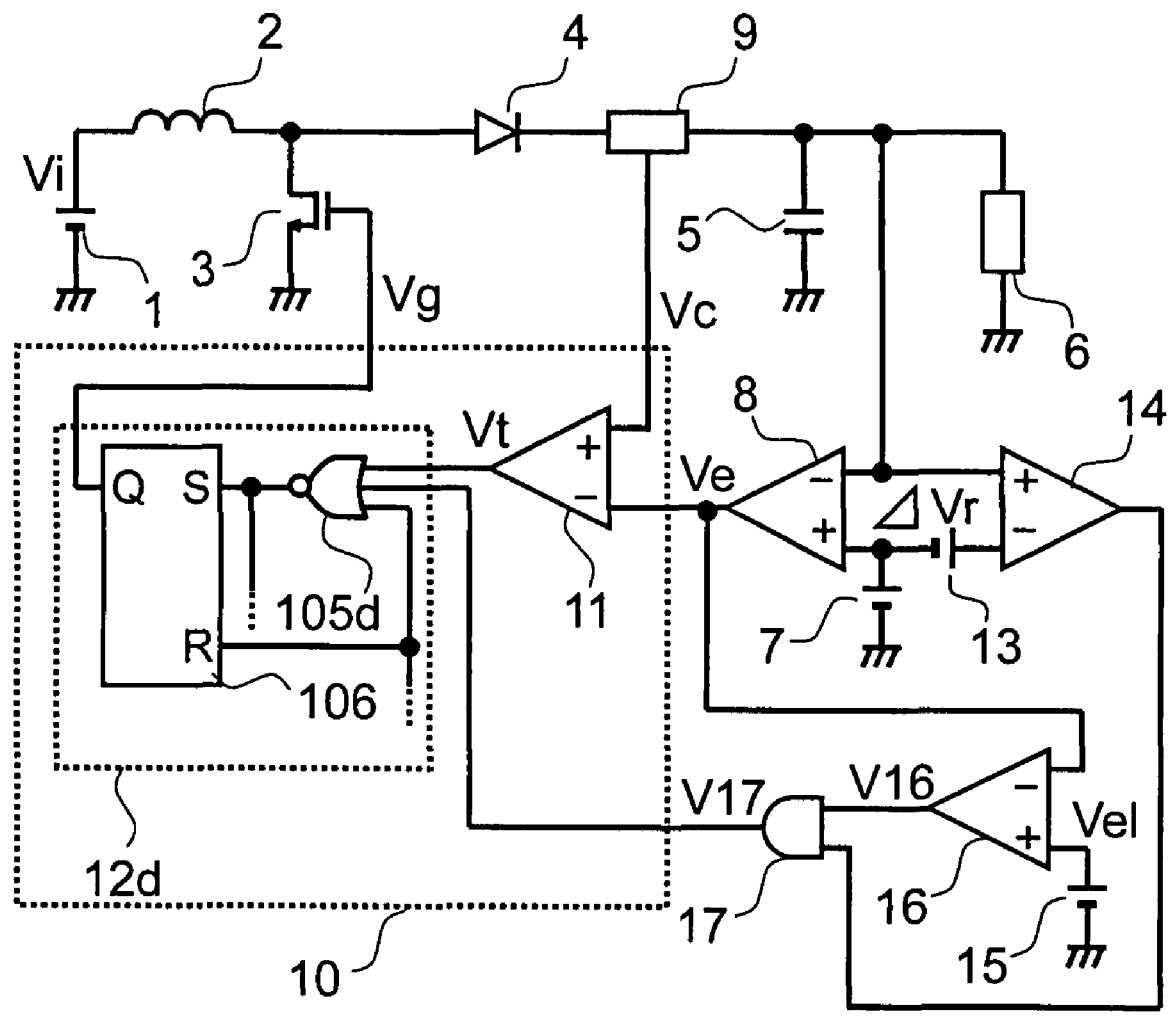
FIG. 7 is a circuit diagram showing a step-up converter according to a sixth embodiment.

FIG. 7 is a circuit diagram showing a step-up converter according to a sixth embodiment of the present invention. Under the condition that the load 6 is light and the output current is small and in the discontinuous mode in which the current of the rectifier 4 becomes zero when the main switch 3 is OFF, described in the above-mentioned fifth embodiment, ΔVr is made small in the step-up converter according to the sixth embodiment. Referring to FIG. 7, the same components as those of the step-up converter according to the fifth embodiment shown in FIG. 6 are designated by the same numerals, and their descriptions are omitted. The step-up converter shown in FIG. 7 differs from the step-up converter according to the fifth embodiment shown in FIG. 6 in that a voltage supply circuit 15 for generating a voltage Ve1 slightly higher than the lower limit voltage of the output Ve of the error amplifier 8, a comparator 16 for comparing the output Ve of the error amplifier 8 with the voltage Ve1, and an AND circuit 17 for outputting the logical AND of the output V16 of the comparator 16 and the output of the comparator 14 are added, and that the output V17 of the AND circuit 17, instead of the output of the comparator 14, is input to the NOR circuit 105 of the timer circuit 12d.

With the configuration described above, during the heavy load operation, the output Ve of the error amplifier 8 is higher than the voltage Ve1, and the output V16 of the comparator 16 is L level. Hence, even when ΔVr is set at a small value and the output of the comparator 14 becomes H level owing to the output ripple voltage, the output V17 of the AND circuit 17 remains L level, and no signal is transmitted to the NOR circuit 105. The output of the comparator 14 becomes H level and the OFF time of the main switch 3 is extended only when the load becomes light, the output Ve of the error amplifier 8 becomes equal to the voltage Ve1 or less, and the output V16 of the comparator 16 becomes H level.

The output V16 of the comparator 16 is used as a signal for judging whether the step-up converter according to the sixth embodiment is in the discontinuous mode at light load or the continuous mode at heavy load. When the mode is switched between the discontinuous mode and the continuous mode, if the switching is repeated between the two modes, there occurs a problem of increasing the output ripple voltage, for example. For this reason, it is desirable that the comparator 16 of the step-up converter according to the present invention should have hysteresis.

Seventh Embodiment

Figure 8:
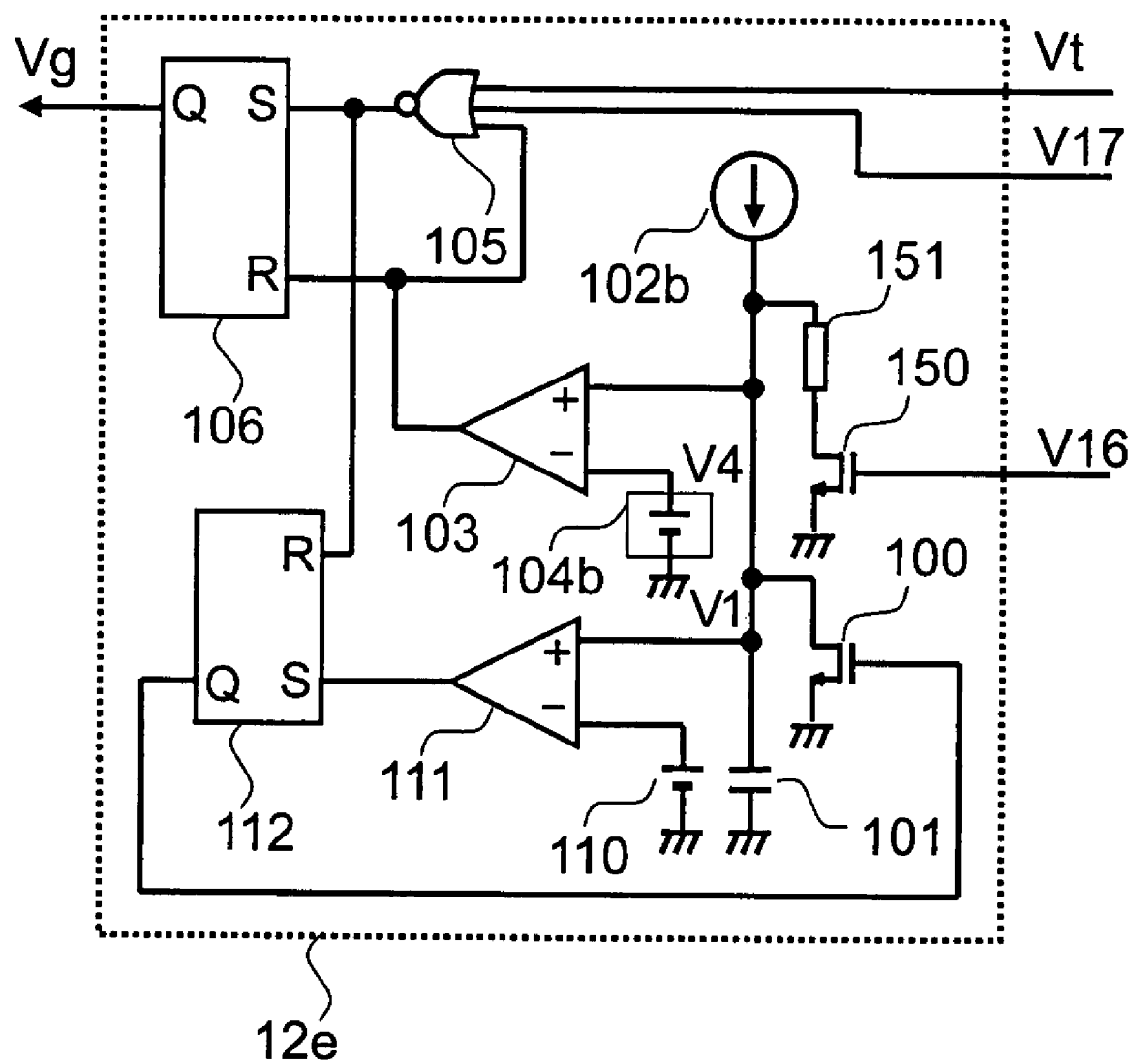
FIG. 8 is a circuit diagram showing the timer circuit 12e of a step-up converter according to a seventh embodiment.

FIG. 8 is a circuit diagram showing the timer circuit 12e of a step-up converter according to a seventh embodiment of the present invention. The step-up converter according to the seventh embodiment can avoid the phenomenon in which, when the mode is switched between the discontinuous mode and the continuous mode, the switching is repeated between the two modes. Referring to FIG. 8, the same components as those of the step-up converter according to the sixth embodiment shown in FIG. 7 are designated by the same numerals, and their descriptions are omitted. The step-up converter shown in FIG. 8 differs from the step-up converter according to the sixth embodiment shown in FIG. 7 in that an NMOS transistor 150, to the gate of which the output V16 of the comparator 16 is applied, and a resistor 151 connected between the capacitor 101 and the drain of the NMOS transistor 150 are added.

With the configuration described above, when the load becomes light and the output V16 of the comparator 16 becomes H level, the NMOS transistor 150 turns ON, and the resistor 151 is connected in parallel with the capacitor 101. Hence, when the main switch 3 is ON, that is, when the capacitor 101 is charged by the current supply circuit 102b, the charging current is shunted to the resistor 151, and the rising speed of the voltage V1 of the capacitor 101 lowers. For this reason, the ON time of the main switch 3, being set using the timer circuit 12e, becomes longer than the ON time in the continuous mode at heavy load. If the ON time of the main switch 3 becomes longer, the energy stored in the inductor 2 increases, the electric charge for charging the output capacitor 5 during the OFF time of the main switch 3 increases, and the output DC voltage Vo rises. When the output DC voltage Vo rises, the output Ve of the error amplifier 8 further lowers. As a result, the discontinuous mode becomes deeper, and the phenomenon in which, when the mode is switched between the discontinuous mode and the continuous mode, the switching is repeated between the two modes is avoided.

Eighth Embodiment

Although the step-up converters according to the respective embodiments described above have been described assuming that the diode is used as a rectifier, when a synchronous rectifier formed of a PMOS transistor or the like is used, the loss of the current detector 9 can be reduced. In addition, when such a synchronous rectifier is used, the current can be passed in the opposite direction. A current detector 9 capable of also detecting the current flowing in the opposite direction will be described below.

Figure 9:
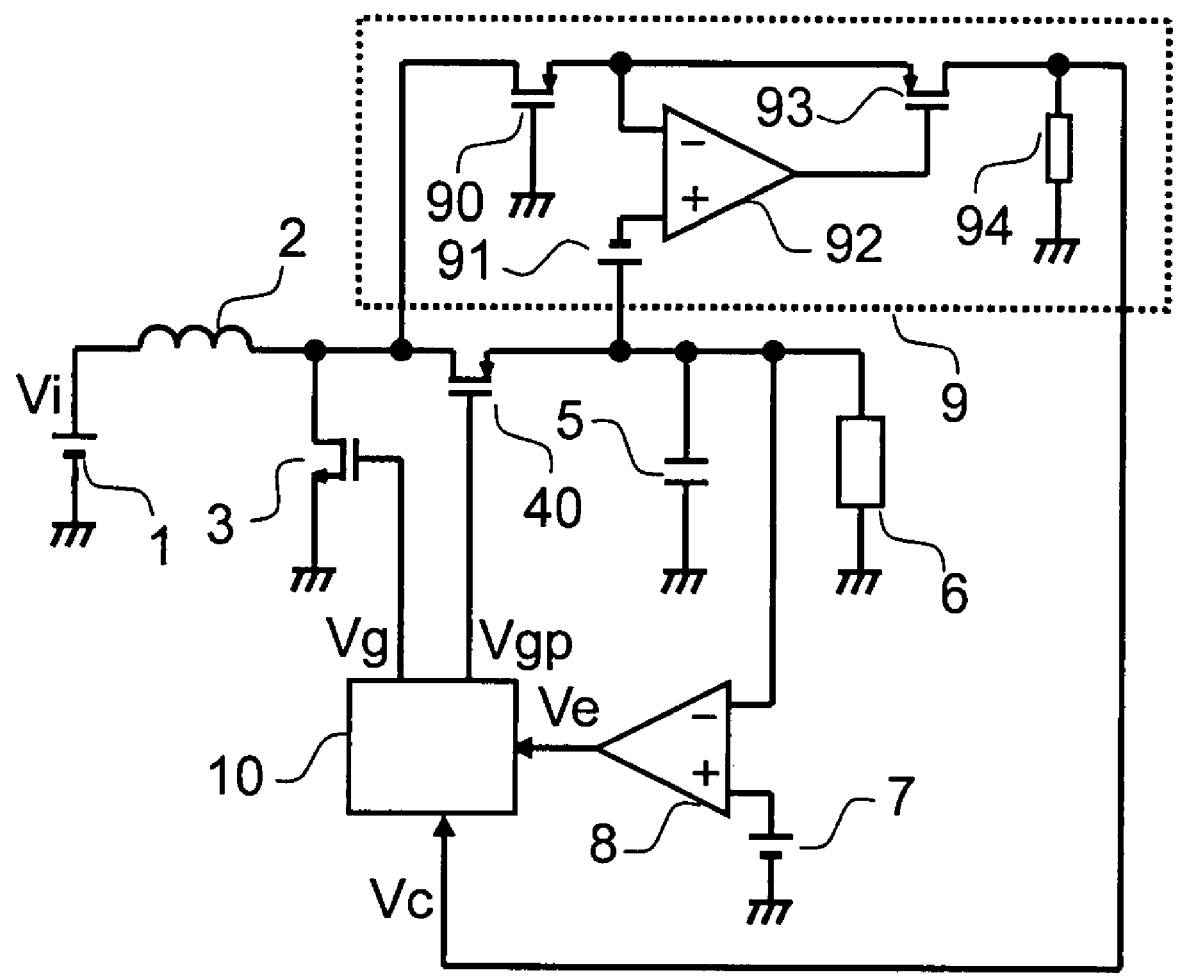
FIG. 9 is a circuit diagram showing a step-up converter according to an eighth embodiment.
Figure 10:
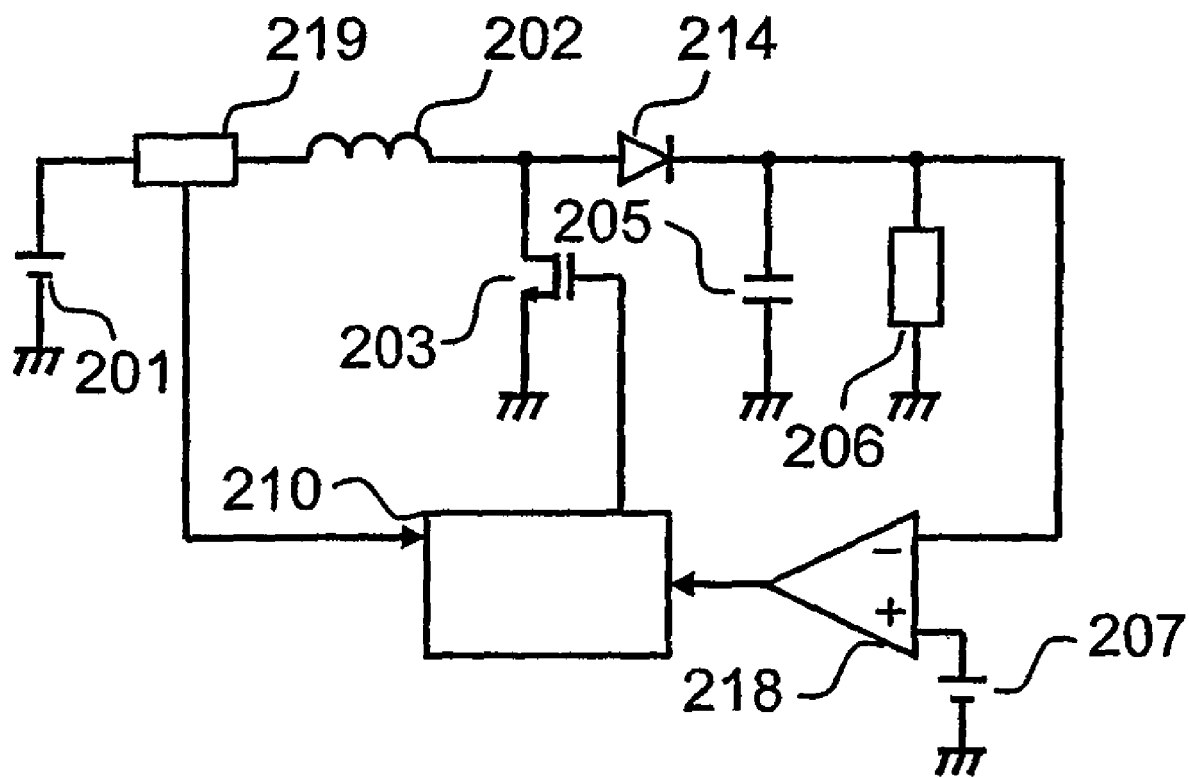
FIG. 10 is a circuit diagram showing the conventional step-up converter.

FIG. 9 is a circuit diagram showing a step-up converter according to an eighth embodiment of the present invention. Referring to FIG. 9, the same components as those of the step-up converter according to the first embodiment shown in FIG. 1A are designated by the same numerals, and their descriptions are omitted. The step-up converter shown in FIG. 9 differs from the step-up converter according to the first embodiment shown in FIG. 1A in that the rectifier 4 represented by a diode in FIG. 1A is replaced with a synchronous rectifier 40 formed of a PMOS transistor and that the detailed configuration of the current detector 9 is shown. The rectifier 40 is formed of a PMOS transistor that is ON/OFF controlled using a drive signal Vgp supplied from the control circuit 10. Although the drive signal Vgp is in phase with the drive signal Vg, the drive signal Vgp is provided with an idle period so that the drive signal Vgp and the main switch 3 do not turn ON at the same time.

Referring to FIG. 9, the current detector 9 comprises a PMOS transistor 90 that is small in size and mounted on the same circuit board on which the PMOS transistor serving as the rectifier 40 is mounted; an offset voltage supply circuit 91, the positive electrode of which is connected to the source of the PMOS transistor serving as the rectifier 40; a differential amplifier 92 to which the negative electrode of the offset voltage supply circuit 91 and the source of the PMOS transistor 90 are connected; a PMOS transistor 93, the source of which is connected to the source of the PMOS transistor 90; and a resistor 94 connected to the drain of the PMOS transistor 93. Since the PMOS transistor 90, the gain of which is grounded, is ON and the drain thereof is connected to the drain of the PMOS transistor serving as the rectifier 40, a current mirror circuit is formed when the PMOS transistor serving as the rectifier 40 is ON. The output of the differential amplifier 92 is applied to the gate of the PMOS transistor 93. Current flows from the PMOS transistor 90 via the PMOS transistor 93 to the resistor 94, and the voltage drop thereof is output as the current detection signal Vc.

The gate of the PMOS transistor 90 is not required to be grounded but may be connected to the gate of the PMOS transistor serving as the rectifier 40.

With the configuration described above, the current flowing in the rectifier 40 can be detected using the current detection signal Vc as described below. It is assumed that the current flowing in the rectifier 40 is I4, that the ON resistance of the PMOS transistor serving as the rectifier 40 is R4, that the ON resistance of the PMOS transistor is R9, and that the offset voltage of the offset voltage supply circuit 91 is Vos. The voltage drop of the PMOS transistor serving as the rectifier 40, being in the ON state, is I4×R4. Since the differential amplifier 92 adjusts the ON resistance of the PMOS transistor 93 so that the potential difference between the input terminals thereof becomes 0 V, the voltage between the drain and the source of the PMOS transistor 90 becomes I4×R4+Vos. Hence, the current I9 flowing from the PMOS transistor 90 via the PMOS transistor 93 is represented by the following expression (9).

$$I9 = I4 \times R4/R9 + Vos/R9 \quad (9)$$

Furthermore, when it is assumed that the resistance value of the resistor 94 is R94, the current detection signal Vc is represented by the following expression (10).

$$Vc = I4 \times (R94 \times R4/R9) + Vos \times R94/R9 \quad (10)$$

As clarified by these expressions (9) and (10), the current detection signal Vc is linear with the current I4 flowing in the rectifier 40. In addition, when it is assumed that the lower limit voltage that is compared with the error signal Ve using the comparator 11 is Ve1, the lower limit value I4min of the current I4, which can be detected and controlled, is represented by the following expression (11).

$$I4min = (Ve1 \times R9/R94 - Vos)/R4 \quad (11)$$

From the expression (11), by making the offset voltage Vos larger than Ve1×R9/R94, it is understood that the negative current I4, that is, the current flowing in the rectifier 40 in the opposite direction, can also be detected and controlled. Since the current flowing in the opposite direction can be detected and controlled, the discontinuous mode described in the sixth embodiment and the seventh embodiment is not necessary. Furthermore, this configuration can quickly cope with increase in output owing to abrupt decrease in load or the like.

Although it is assumed that the current detection signal Vc is a voltage signal in the above description, the current detection signal is not limited to such a voltage signal. By converting the output Ve of the error amplifier 8, being also assumed to be a voltage signal, into a current signal, the comparator 11 may be configured so as to compare the converted current signal with the detection current I9 represented by the expression (9).

Furthermore, since (R4/R9) in the expression (9) is the ratio between the ON resistances of the two PMOS transistors having the same configuration but different in size, the ratio can be prevented from being affected by variations and fluctuations due to temperature characteristics and the like. Similarly, with respect to the offset voltage Vos, by using the voltage drops that are obtained by turning ON the PMOS transistors having the same configuration and then by passing a constant current therethrough, (Vos/R9) can also be prevented from being affected by variations and fluctuations due to temperature characteristics and the like.

As described above, the present invention is useful for a step-up power supply circuit or the like for supplying a DC voltage to various electronic apparatuses.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

What is claimed is:

1. A step-up converter, having an inductor and a main switch connected in series, a rectifier for rectifying the voltage across the two terminals of said main switch and a smoothing section for smoothing the rectified voltage, for stepping up an input DC voltage input to said inductor by the ON/OFF operation of said main switch and outputting an output DC voltage from said smoothing section, comprising:

a current detector for generating a current detection signal corresponding to the current of said rectifier;

an error amplifier for generating an error signal corresponding to said output DC voltage; and a control circuit for turning ON/OFF said main switch on the basis of said current detection signal and said error signal, wherein said rectifier is a rectifying transistor for alternately turning ON/OFF said main switch, said current detector is equipped with a detection transistor so that said detection transistor and said rectifying transistor form a current mirror circuit at least when turned ON to generate said current detection signal on the basis of the current of said detection transistor, and said current detector is equipped with a differential amplifier to which the voltages at the current output terminals of said rectifying transistor and said detection transistor are input and an adjustment transistor, the conduction resistance of which is adjusted using the output of said differential amplifier, and said adjustment transistor is connected to the current output terminal of said detection transistor to generate said current detection signal on the basis of the current of said detection transistor flowing via said adjustment transistor.

2. The step-up converter according to claim 1, wherein a predetermined offset voltage is set across the two input terminals of said differential amplifier of said current detector.

3. A step-up converter, having an inductor and a main switch connected in series, a rectifier for rectifying the voltage across the two terminals of said main switch and a smoothing section for smoothing the rectified voltage, for stepping up an input DC voltage input to said inductor by the ON/OFF operation of said main switch and outputting an output DC voltage from said smoothing section, comprising:
　a current detector for generating a current detection signal corresponding to the current of said rectifier;
　an error amplifier for generating an error signal corresponding to said output DC voltage; and
　a control circuit for turning ON/OFF said main switch on the basis of said current detection signal and said error signal,
　wherein said control circuit is configured such that a predetermined ON time is set and said main switch is turned ON only during said predetermined ON time, and such that said main switch is turned OFF until the level of said current detection signal reaches the level of said error signal.

4. The step-up converter according to claim 3, wherein said control circuit is configured such that as the input DC voltage increases, said predetermined ON time is decreased.

5. The step-up converter according to claim 3, wherein said control circuit is configured such that as the target value of said output DC voltage increases, said predetermined ON time is increased.

6. The step-up converter according to claim 3, wherein said error amplifier is configured to generate an error signal obtained by amplifying the difference between said output DC voltage and the target value thereof, and
　said control circuit is configured such that said main switch is turned OFF when said output DC voltage exceeds a predetermined value higher than said target value and until said output DC voltage becomes lower than said predetermined value.

7. The step-up converter according to claim 3, wherein said control circuit is configured such that said main switch is turned OFF when the level of said error signal is a predetermined level or less, when said output DC voltage exceeds said predetermined value higher than said target value and until said output DC voltage becomes lower than said predetermined value.

8. The step-up converter according to claim 7, wherein said control circuit is configured such that said predetermined ON time is made longer when the level of said error signal is a predetermined level or less.

9. A step-up converter, having an inductor and a main switch connected in series, a rectifier for rectifying the voltage across the two terminals of said main switch and a smoothing section for smoothing the rectified voltage, for stepping up an input DC voltage input to said inductor by the ON/OFF operation of said main switch and outputting an output DC voltage from said smoothing section, comprising:
　a current detector for generating a current detection signal corresponding to the current of said rectifier;
　an error amplifier for generating an error signal corresponding to said output DC voltage; and
　a control circuit for turning ON/OFF said main switch on the basis of said current detection signal and said error signal,
　wherein said control circuit is configured such that a predetermined ON time and a predetermined OFF time are set and said main switch is turned ON only during said predetermined ON time, and such that said main switch is turned OFF during said predetermined OFF time or until the level of said current detection signal reaches the level of said error signal.

10. The step-up converter according to claim 9, wherein said control circuit is configured such that said predetermined ON time and a predetermined period including said predetermined ON time are set, and such that said predetermined OFF time is set on the basis of the time difference between said predetermined period and said predetermined ON time.

11. The step-up converter according to claim 9, wherein said control circuit is configured such that as the input DC voltage is higher, said predetermined ON time is set shorter.

12. The step-up converter according to claim 9, wherein said control circuit is configured such that as the target value of said output DC voltage is higher, said predetermined ON time is set longer.

13. The step-up converter according to claim 9, wherein said error amplifier is configured to generate an error signal obtained by amplifying the difference between said output DC voltage and the target value thereof, and
　said control circuit is configured such that said main switch is turned OFF when said output DC voltage exceeds a predetermined value higher than said target value and until said output DC voltage becomes lower than said predetermined value.

14. The step-up converter according to claim 9, wherein said control circuit is configured such that said main switch is turned OFF when the level of said error signal is a predetermined level or less, when said output DC voltage exceeds said predetermined value higher than said target value and until said output DC voltage becomes lower than said predetermined value.

15. The step-up converter according to claim 14, wherein said control circuit is configured such that said predetermined ON time is made longer when the level of said error signal is a predetermined level or less.

* * * * *